(12) United States Patent
Charier et al.

(10) Patent No.: US 10,899,432 B2
(45) Date of Patent: Jan. 26, 2021

(54) FAN MODULE WITH VARIABLE PITCH BLADES

(71) Applicant: SAFRAN AIRCRAFT ENGINES, Paris (FR)

(72) Inventors: Gilles Alain Marie Charier, La Grande Paroisse (FR); Kevin Morgane Lemarchand, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 171 days.

(21) Appl. No.: 15/982,871

(22) Filed: May 17, 2018

(65) Prior Publication Data

US 2018/0335047 A1    Nov. 22, 2018

(30) Foreign Application Priority Data

May 18, 2017    (FR) ...................................... 17 54381

(51) Int. Cl.
*B64C 11/32*    (2006.01)
*F02K 3/06*    (2006.01)
(Continued)

(52) U.S. Cl.
CPC ............ *B64C 11/325* (2013.01); *B64C 11/06* (2013.01); *F02K 1/66* (2013.01); *F02K 3/06* (2013.01);
(Continued)

(58) Field of Classification Search
CPC .... F04D 29/362; F04D 29/323; F04D 29/056; F04D 29/063; B64C 11/06; B64C 11/325;
(Continued)

(56) References Cited

U.S. PATENT DOCUMENTS 2,844,303 A * 7/1958 Kristiansen ........... F04D 29/366
                                                      416/52
3,549,272 A * 12/1970 Bouiller ................ F04D 19/022
                                                      416/166
(Continued)

FOREIGN PATENT DOCUMENTS

EP    2384965 A2 * 11/2011 ........... B64C 11/325
EP    2865593 A1    4/2015
(Continued)

OTHER PUBLICATIONS

Gallet—FR 2956854 A1 Machine Translation (Year: 2010).*
Office Action received for GB Patent Application No. 1808032.5, dated Nov. 8, 2018, 3 pages.

*Primary Examiner* — Ninh H. Nguyen
*Assistant Examiner* — Brian Christopher Delrue
(74) *Attorney, Agent, or Firm* — Womble Bond Dickinson (US) LLP

(57) ABSTRACT

Fan module with variable-pitch blades for a propulsion system that includes:
- a rotor supporting the blades, and including an internal shaft and an external shroud, defining between them a space;
- a pitch control device (22) of the blades that includes a load transfer bearing;
- a feathering device of the blades;
- said feathering device includes at least one lever that is articulated around a fixed axis (A) in relation to the rotor, where said lever features a first end located outside said space and a second end located inside said space, and where a flyweight is fastened to the first end and the second end is coupled to said bearing.

10 Claims, 7 Drawing Sheets

(51) Int. Cl.
  *B64C 11/06*  (2006.01)
  *F04D 29/32*  (2006.01)
  *F02K 1/66*  (2006.01)
  *F04D 29/056*  (2006.01)
  *F04D 29/063*  (2006.01)
  *F04D 29/36*  (2006.01)

(52) U.S. Cl.
  CPC ......... *F04D 29/056* (2013.01); *F04D 29/063* (2013.01); *F04D 29/323* (2013.01); *F04D 29/362* (2013.01); *F05D 2220/323* (2013.01); *F05D 2220/36* (2013.01); *F05D 2260/74* (2013.01); *F05D 2260/77* (2013.01); *F05D 2260/79* (2013.01)

(58) Field of Classification Search
  CPC . B64C 11/385; F02K 1/66; F02K 3/06; F05D 2260/77; F05D 2260/74; F05D 2260/79; F05D 2220/36; F05D 2220/323; F01D 7/00
  See application file for complete search history.

(56) References Cited

U.S. PATENT DOCUMENTS

| | | | | |
|---|---|---|---|---|
| 4,591,313 A | * | 5/1986 | Miyatake | B64C 11/306 416/127 |
| 4,913,623 A | * | 4/1990 | Schilling | B64C 11/346 416/129 |
| 5,174,716 A | * | 12/1992 | Hora | B64C 11/32 416/129 |
| 5,282,719 A | * | 2/1994 | McCarty | B64C 11/32 416/1 |
| 8,740,565 B2 | * | 6/2014 | Perkinson | B64C 11/48 416/129 |
| 8,932,018 B2 | * | 1/2015 | Gallet | B64C 11/325 416/153 |
| 8,985,954 B2 | * | 3/2015 | Balk | B64C 11/32 415/129 |
| 9,366,147 B2 | * | 6/2016 | Gallet | B64C 11/325 |
| 2008/0173114 A1 | * | 7/2008 | Charier | F01D 25/183 74/15.63 |
| 2010/0021295 A1 | * | 1/2010 | Perkinson | B64C 11/06 416/1 |
| 2011/0238187 A1 | * | 9/2011 | Evans | A45B 9/00 623/27 |
| 2011/0274545 A1 | * | 11/2011 | Morgan | B64C 11/32 416/151 |
| 2012/0070289 A1 | * | 3/2012 | Charier | F01D 7/00 416/147 |
| 2012/0070290 A1 | * | 3/2012 | Balk | B64C 11/32 416/147 |
| 2012/0070292 A1 | * | 3/2012 | Balk | B64C 11/306 416/168 A |
| 2013/0047756 A1 | * | 2/2013 | Gallet | B64C 11/325 74/89.13 |
| 2013/0170988 A1 | * | 7/2013 | Guey | F03D 7/0224 416/9 |
| 2013/0323050 A1 | * | 12/2013 | Kleckler | F02C 9/58 416/1 |
| 2014/0205457 A1 | * | 7/2014 | Curlier | B64C 11/306 416/160 |
| 2015/0219014 A1 | * | 8/2015 | Belmonte | F01D 17/26 415/68 |
| 2016/0032740 A1 | * | 2/2016 | Niergarth | F01D 7/02 60/805 |
| 2018/0335046 A1 | * | 11/2018 | Charier | F04D 29/056 |
| 2019/0031319 A1 | * | 1/2019 | Calkins | B64C 11/385 |

FOREIGN PATENT DOCUMENTS

| | | | |
|---|---|---|---|
| EP | 3165452 A1 | | 5/2017 |
| FR | 2311947 A1 | * | 12/1976 |
| FR | 2956854 A1 | * | 9/2011 ............. F01D 7/00 |
| FR | 2956854 A1 | | 9/2011 |

* cited by examiner

FAN MODULE WITH VARIABLE PITCH BLADES

TECHNICAL FIELD

This invention concerns a ducted fan module with variable-pitch blades for a propulsion system, and more particularly a blade feathering device adapted to such fan.

STATE OF THE ART

A fan fitted with variable-pitch blades allows to adjust the pitch (and more precisely the pitch angle) of the blades based on the flight parameters, thereby optimising the operation of the fan, and more broadly of the propulsion system in which the fan is integrated. It is worth noting that the pitch angle of a blade is the angle, in a longitudinal plane that is perpendicular to the rotation axis of the blade, between the blade chord and the rotation plane of the fan.

For certification purposes, the fan must include a feathering system for the blades, i.e. a device used to position the blades so as to ensure that the blades provide the best possible bypass ratio in the running direction. Generally, in a feathered position, the pitch angle of the blades is of 90°. The blades are, for example, placed in feathered position when there is a failure (or malfunction) of the blade pitch control device (for example hydraulic actuator failure) so that the blades generate the least possible drag.

To increase the performance of the fan, engine manufacturers are always trying to reduce the hub ratio of the fan. The hub ratio is the ratio of the outer shell diameter of the blade shanks at the leading edge of the blades to the diameter of the circle joining the external radial ends of the blades. With a constant fan diameter, in order to reduce the hub ratio, i.e. the diameter of the outer shell, the suction section of the fan must be extended, which entails an increase of the treated flow, and consequently, an improved propulsive efficiency.

Traditionally, the blade feathering device is located radially between the blade pitch control device and the blade pivots, the latter being specific to each blade or shared by all the blades.

The prior art also includes documents EP-A1-3165452, US-A1-2014/205457, US-A1-2012/070290 and FR-A1-2956854.

The purpose of this invention is to propose a blade feathering device that enables to significantly reduce the diameter of the outer shell, and therefore the hub ratio defined above.

PRESENTATION OF THE INVENTION

For this purpose, the invention proposes a fan module with variable-pitch blades for a propulsion system along the longitudinal axis X, where said module includes:
- a rotor supporting the blades, and including an internal annular shaft and an external annular shroud that extends around the shaft, an upstream axial end of the shaft is connected to an upstream axial end of the shroud, whereby the shaft and the shroud together create an annular space;
- a blade pitch control device, whereby said device is located in said space and includes a load transfer bearing;
- a blade feathering device, in particular for malfunctions of said control device;

characterised in that said feathering device includes at least one lever that is articulated around a fixed axis A in relation to the rotor, where said lever features a first end located outside said space and a second end located inside said space, and where a flyweight is fixed to the first end and the second end is coupled to said bearing, and where the flyweight, by centrifugal force, can move into a position in which said bearing imposes a feathered position to the blades.

This feathering device uses all the available distance inside the annular space (and more accurately between the shroud and the cone). This technical feature significantly reduces the ring space (or oil enclosure), and consequently the hub ratio, thereby improving the fan's performance (in particular the specific flow rate).

This type of fan increases the "bypass ratio" (BPR) of the propulsion system, and reduces the fuel consumption of the propulsion system.

It is worth noting that the BPR is the ratio of the air flow rate in the secondary flow path to the air flow rate in the primary flow path of the propulsion system.

The fan module according to the invention can include one or several of the following features, taken individually or in combination:
- the flyweight is able to move along a longitudinal plane P that is perpendicular to said axis A;
- the second end is coupled to said bearing by means of an articulated tie rod located at each one of its ends.
- the tie rod is articulated to an external synchroniser ring fixed to an external ring of said bearing;
- the flyweight is located between said shroud of said rotor and a cone and/or a shell of said rotor;
- said at least one lever includes at least one arm located outside said space and a connecting rod located inside said space, whereby said arm and said connecting rod are linked in rotation;
- said arm and/or said connecting rod is (are) articulated around said axis A;
- said at least one lever is articulated around said axis A, in relation to a cap of said shroud, whereby said cap is preferentially added to the shroud;
- the articulation between said lever and said cap includes sealing means;
- said cap defines an interior cavity, whereby said shroud contains a drain to collect a lubricating fluid contained in said cavity and to evacuate said lubricant in the downstream section of said space;
- said lever is generally L-shaped or V-shaped.

DESCRIPTION OF THE FIGURES

The invention is better understood, and other details, characteristics and advantages of this invention will be clearer upon reading the following description, provided as an example and not limited thereto, and with reference to the appended drawings, in which.

DETAILED DESCRIPTION

Figure 1:
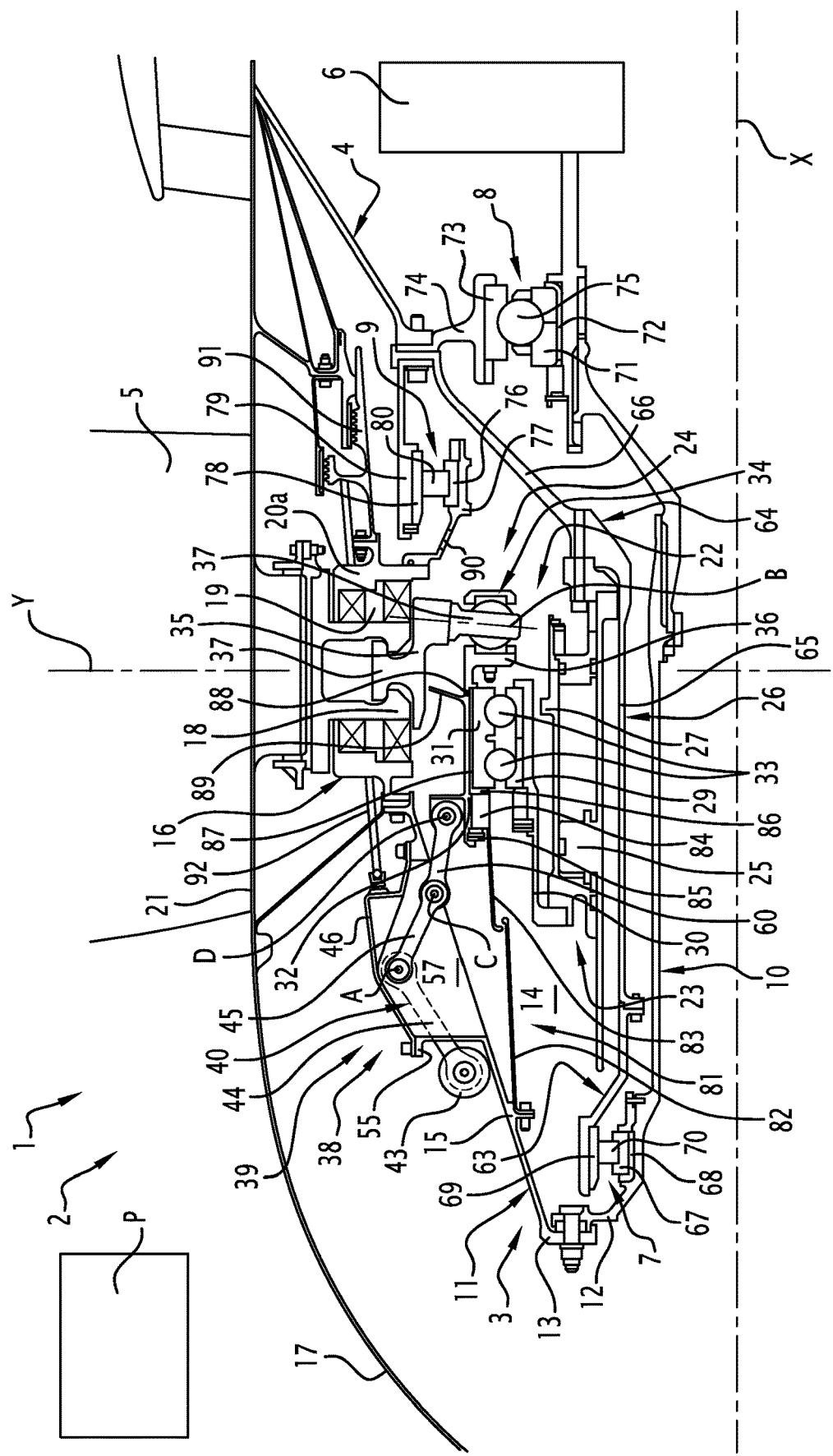
FIG. 1 is an axial (or longitudinal) semi cross section view of a fan module fitted with a blade feathering device, positioned in a first position, along an axial plane intersecting with the rotation axis of a blade of the fan.

FIG. 1 shows a ducted fan 1 of a propulsion system 2 along a longitudinal axis X. The fan 1 includes a rotor 3 moving around axis X with respect to a fixed crankcase 4, whereby the rotor 3 supports a series of variable-pitch blades 5. In this configuration, the fan 1 is located upstream from the engine unit of the propulsion system 2, which includes, for example, in succession in the upstream to downstream direction, a gas generator, and a turbine that drives the rotor 3 of the fan 1 through a reducing gear 6.

By convention, in this application, the terms "upstream" and "downstream" are defined in relation to the direction of flow of the gases within the fan 1 (or propulsion system 2). Furthermore, by convention in the this application, the terms "internal" and "external", or "inside" and "outside" are defined radially in relation to the longitudinal (or axial) axis X of the propulsion system 2, which is also the rotation axis of the rotors of the compressors and turbines of the gas generator.

The rotor 3 is rotationally guided, with respect to the fixed crankcase 4, by at least one first bearing 7 located upstream and by at least second and third bearings 8,9 located downstream. Rotor 3 includes an internal annular shaft 10 centred on the axis X, and an external annular shroud 11 centred on the axis X and extending around the shaft 10. The upstream axial end 12 of the shaft 10 is clamped to an upstream axial end 13 of the shroud 11, whereby the shaft 10 and the shroud 11 define together an annular space 14 commonly called "oil enclosure".

Figure 2:
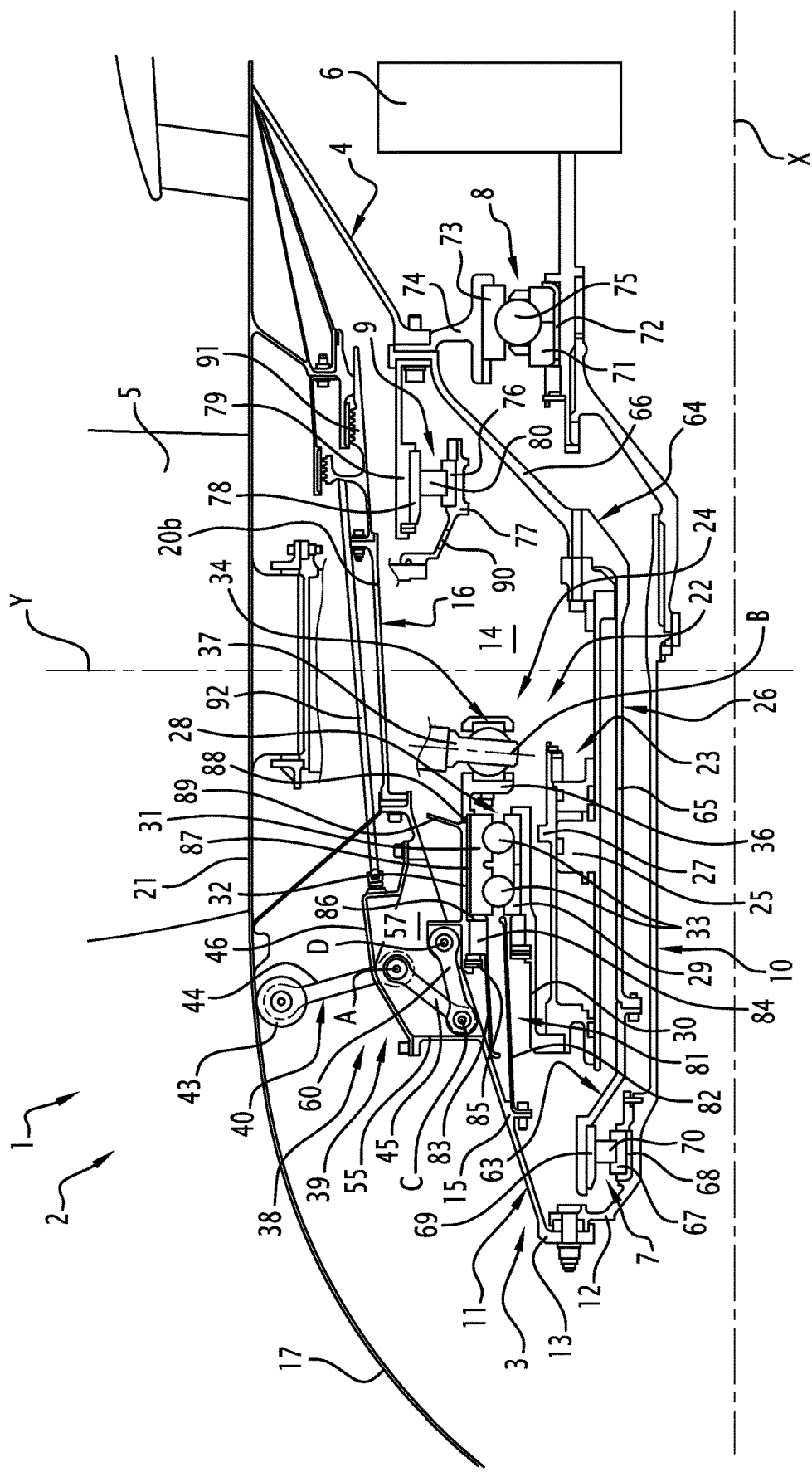
FIG. 2 is an axial semi cross-section view of the fan module in FIG. 1, in which the blade feathering device is in a second position, along an axial plane not intersecting with the rotation axis of a blade of the fan.
Figure 3:
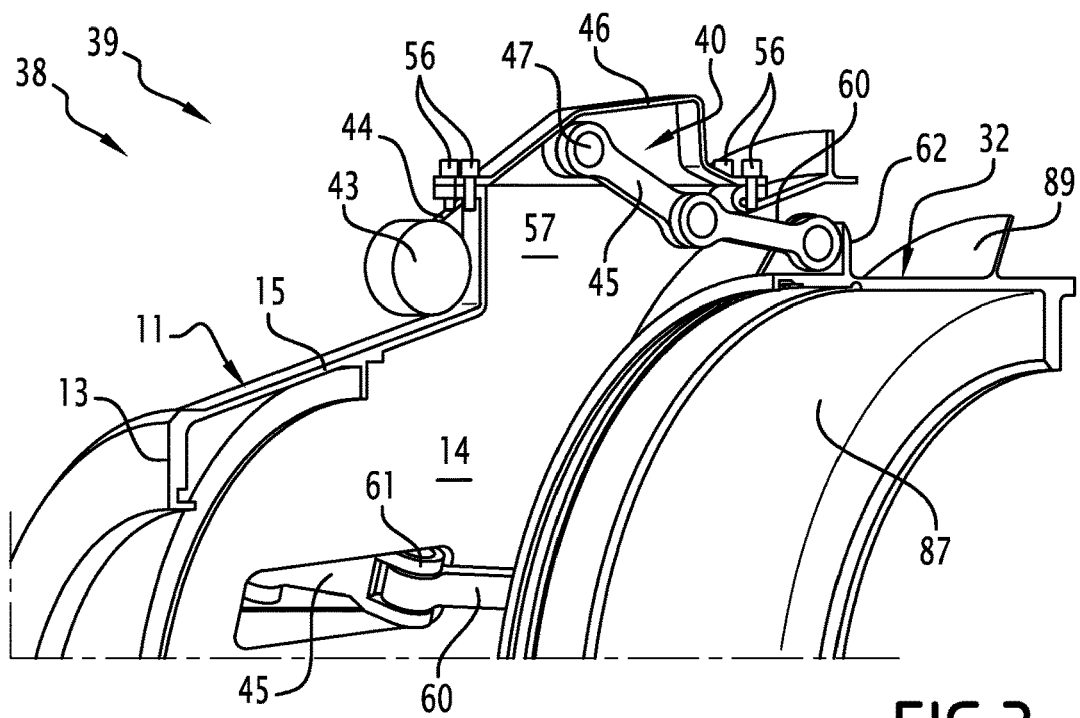
FIG. 3 is a detailed perspective and an axial semi cross-section view of a mechanism of the blade feathering device in FIG. 1.
Figure 4:
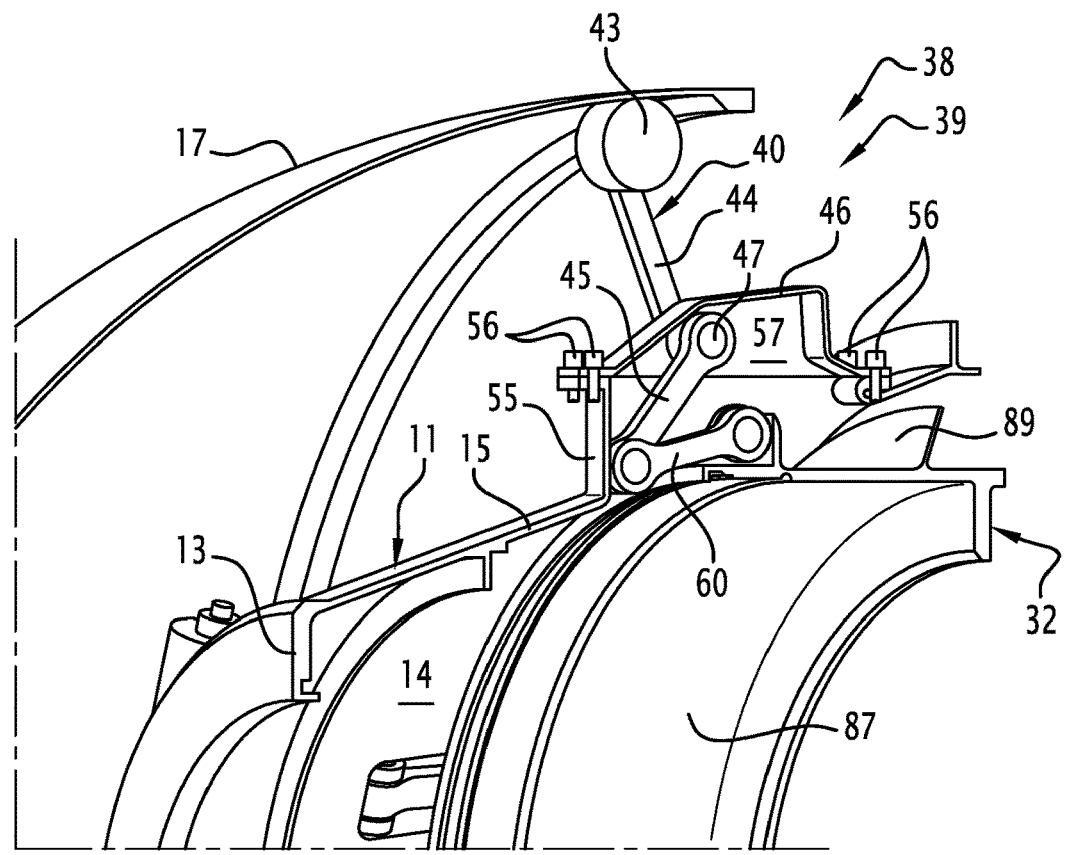
FIG. 4 is a detailed perspective and an axial semi cross-section view of a mechanism of the blade feathering device in FIG. 2.

In the embodiment shown in the figures, and in particular in FIGS. 1 and 2, the shaft 10 and the shroud 11 form a pin according to an axial semi cross section view. The shaft 10 of the rotor 3 is driven by a turbine and through the reducing gear 6. The shroud 11 includes, in the upstream to downstream direction, a frustoconical wall 15, widening in the upstream to downstream direction (with respect to the axis X) and a ring 16 supporting the blades 5, whereby said ring 16 is clamped to the wall 15. The rotor 3 also includes an inlet cone 17 of the fan 1, centred on the axis X and widening in the upstream to downstream direction.

More accurately, each blade 5 includes a shank, for example in the form of a bulb-shaped fastener, whereby said shank is fixed to a pivot 18 mounted in a housing 19 of a protruding base 20a of the ring 16, capable of rotating around a largely radial axis Y by means of two roller bearings. In reference to FIG. 2, the ring 16 features a surface 20b that is largely level between two successive bases 20a.

The shanks of the blades 5 are covered in an external annular shell 21 centred on X and featuring a largely circular cross section, whereby the latter is largely tangential to the downstream end of cone 17, for the purpose of ensuring aerodynamic continuity. The pivot 18 of each blade is isolated from the annular space 14 by means of a hood (not shown). The roller bearings located in each housing 19 are generally lubricated with grease.

It is worth noting that the diameter of external shell 21 at the leading edge of the blades 5 is one of the components used to determine the hub ratio.

The fan 1 includes a control device 22 for the pitch of the blades 5 (or angle of the blades 5) around their axis Y, and more particularly for the pitch angle of the blades 5, which is, for a given blade 5, the angle, in a longitudinal plane perpendicular to axis Y, between the chord of the blade 5 and the rotation plane of the fan 1. The control device 22 is located inside the annular space 14.

The blades 5 are in reverse position in FIGS. 1, 3, 5, 7 and 10. In the "reverse" position, the pitch angle of the blades 5 is negative. This position of the blades 5 generates a reverse thrust, thereby participating in slowing down the aircraft, along with the brakes, so as to reduce the braking distance at landing.

The blades 5 are in feathered position in FIGS. 2, 4, 6, 8, 11 and 12. In the feathered position, the pitch angle is positive and generally of 90°. This position of the blades 5 limits the resistance (drag) generated by the blades.

In one embodiment shown in the figures, and in particular in FIGS. 1 and 2, the control device 22 of the pitch of the blades 5 includes an annular linear actuator 23, centred on axis X, shared by all the blades 5, and a motion conversion device 24 specific to each of the blades 5, whereby the conversion device 24 converts the linear motion initiated by the actuator 23 into a rotating motion of the corresponding blade 5.

More precisely, the linear actuator 23 includes a fixed body 25 added to an annular support 26 (centred on X) of the fixed crankcase 4 and a mobile body 27 in translation with respect to the fixed body 25 along the axis X. Advantageously, the linear actuator 23 is hydraulically powered.

The control device 22 also includes a "load transfer bearing" 28, or LTB, fastened to the mobile body 27 and enabling the transmission of the linear motion initiated by the actuator. This load transfer bearing 28 is a roller bearing (centred on axis X) that includes an internal ring 29 fixed on an internal synchroniser ring 30 (centred on axis X) fastened to the mobile body 27 of the actuator 23, and an external ring 31 housed and fastened in an external synchroniser ring 32 that drives the pitch adjustment of the blades 5. The internal and external rings 29, 31 define two rolling tracks for the rolling elements 33 (balls 33 in this specific case). The balls 33 are in radial contact with the external ring 31, and in angular contact with the internal ring 29.

The LTB provides for the transmission of the motion initiated by the linear actuator 23 (connected to the crankcase 4, a fixed marker) to the rotating marker (connected to the rotor 3). Having a linear actuator in a fixed marker facilitates its oil supply and reduces the rotating mass.

The device 24 converting linear motion to a rotating motion includes, for each blade 5, a spherical articulation 34

(commonly called a ball-joint connection) with radial contact and a crank handle. The spherical articulation 34 is fastened to a fork section 36 of the external synchroniser ring 32. The spherical articulation 34 includes a ball featuring a radial hole, whereby said ball is enclosed in a housing formed by two facing hemispherical halves defined, respectively, in two half-rings. The crank handle 35 includes, at its ends, mechanical rods, both of which protrude in opposite directions, whereby one of the rods 37 is mounted so as to move freely in translation or in rotation in the hole of the corresponding ball according to an axis B (largely radial), and whereby the other is coupled in rotation with the corresponding pivot 18 of the blade (for example, by means of a splined connection). The axis B is offset with respect to the rotation axis Y of the blade 5. The crank handle 35 is used to multiply the force required to adjust the pitch of the corresponding blade 5.

The linear motion of the mobile body 27 of the actuator 23 enables the synchronised adjustment of the pitch of all the blades 5, in particular by means of the external ring 31 of the load transfer bearing 28.

The fan 1 also includes a feathering device 38 of the blades 5, in particular in the event of a control device 22 failure (or malfunction) and, for example if the hydraulic power supply of the linear actuator 23 malfunctions. It should be noted that the feathered position is a positive pitch angle generally of 90°.

The feathering device 38 includes at least one mechanism 39 that features at least one lever 40 articulated around an axis A in relation to the rotor 3. The lever 40 features a first end 41 located outside the space 14 and a second end 42 located inside the space 14, whereby a flyweight 43 is fastened to the first end 41 and the second end 42 is coupled to the load transfer bearing 28. The flyweight 43 is able, by centrifugal force, to move to a position (FIGS. 2, 4, 6, 8, 11 and 12) in which the load transfer bearing 28 imposes a feathered position to the blades 5.

Figure 5:
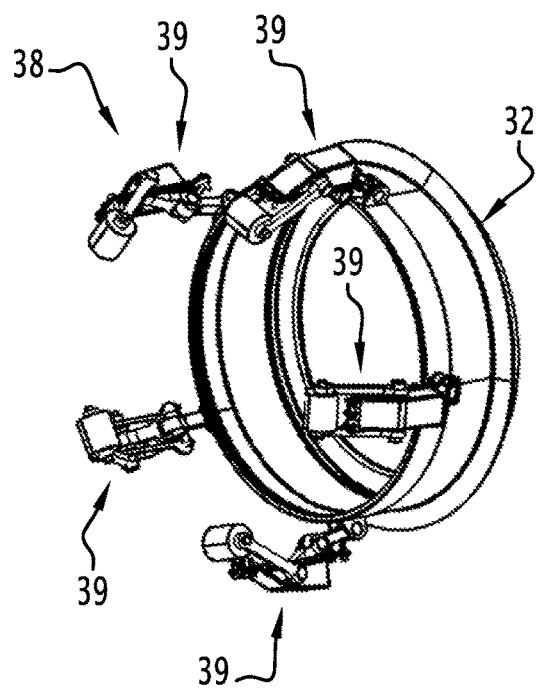
FIG. 5 is a detailed perspective view of the blade feathering device in FIGS. 1 and 3.
Figure 6:
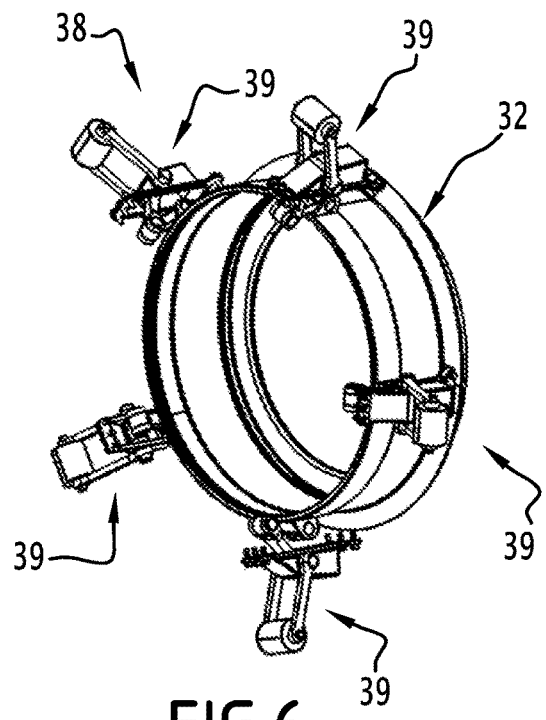
FIG. 6 is a detailed perspective view of the blade feathering device in FIGS. 2 and 4.

In the embodiment shown in FIGS. 5 and 6, the feathering device 38 includes five mechanisms 39 evenly arranged according to an angular distribution around the axis X.

Figure 7:
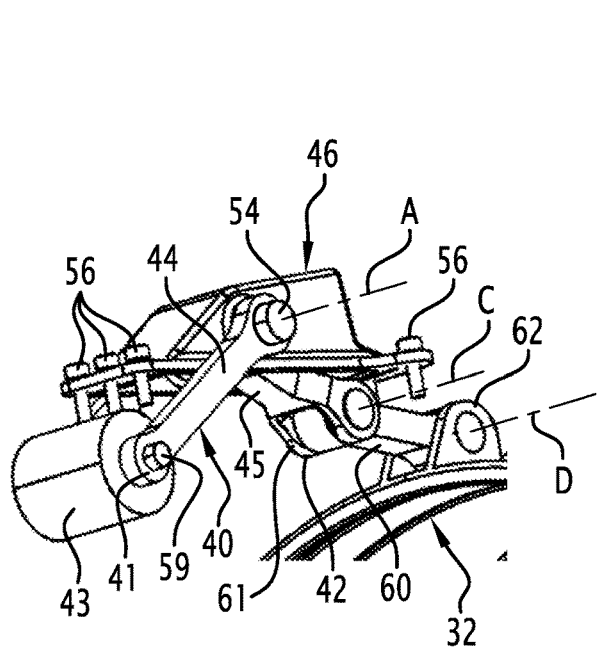
FIG. 7 is a detailed perspective view of the mechanism of the blade feathering device in FIGS. 1, 3 and 5.
Figure 8:
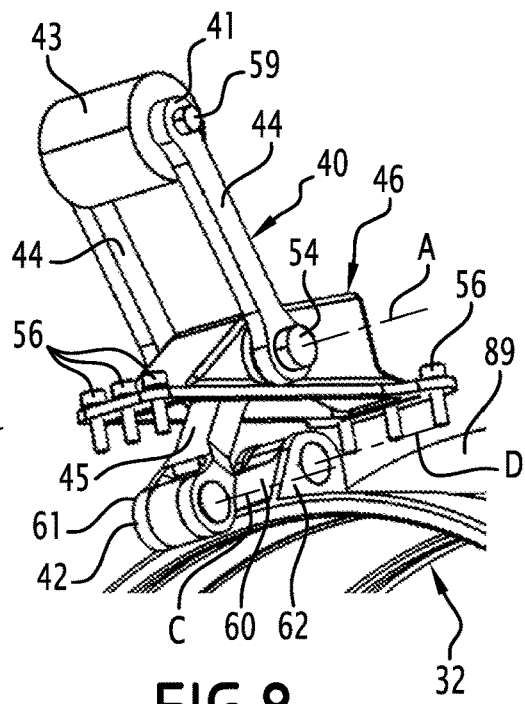
FIG. 8 is a detailed perspective view of the mechanism of the blade feathering device in FIGS. 2, 4 and 6.
Figure 9:
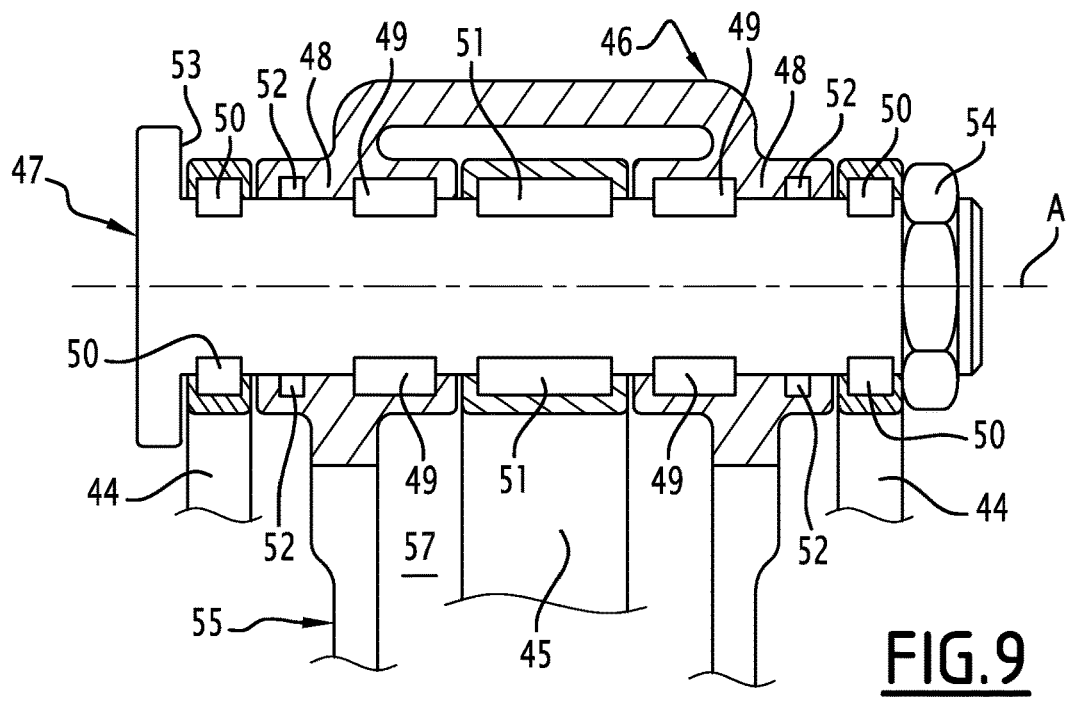
FIG. 9 is a schematic radial (or transversal) cross section view of a mechanism of the blade feathering device, along a plane intersecting with the rotation axis of a lever of said mechanism.

In the embodiment shown in the figures, and more specifically in FIGS. 7 to 9, for each mechanism 39, the lever 40 has an L-shape or a V-shape in an axial cross section view (FIGS. 1 to 4). The lever 40 includes two synchronised parallel arms 44 located outside the space 14 and a connecting rod 45 located inside the space 14. The arms 44 and the connecting rod 45 are rotationally linked and articulated around axis A in relation to a cap 46 on the shroud 11, by means of an axis 47 centred on axis A. Axis A is, in this case, rectilinear and perpendicular to the axis X. The length of an arm 44 is greater that the length of the connecting rod 45, by a factor of two in this case. This length ratio can be used de multiply the force provided by each flyweight 43 and, in other words, to reduce its individual mass and, more broadly, to reduce the mass of all the flyweights 43.

More specifically, as shown in FIG. 9, the axis 47 runs through (transversally) the entire length of the cap 46 and is rotationally guided in relation to the ranges 48 of said cap through rotational guiding means 49. The rotational guiding means 49 includes, for example pads and/or roller bearings, etc. The arms 44 are placed along the side of the cap 46, whereby each of them is rotationally linked to axis 47 by the first rotational linking means 50. The connecting rod 45 is placed between the ranges 48 of the cap 46 and is rotationally linked to the axis 47 by the second rotational linking means 51. The first and second rotational linking means 50, 51 are, for example, dowels and/or pins and/or splines, etc.

To ensure the sealing of the articulation between the lever 40 and the cap 46, sealing means 52 is added between the ranges 48 of the hat 46 and the axis 47. This axis 47 is axially stopped at one if its ends by a retaining wall 53, and by a nut 54 at its opposite end.

The cap 46 is domed and placed on a boss 55 of the shroud 11, whereby the boss 55 protrudes radially towards the outside. The cap 46 is fastened to the boss 55 with three downstream screws 56 and three upstream screws 56 (FIGS. 7 and 8). The boss 55 and the corresponding cap 46 together define, within the space 14, a cavity 57 (FIGS. 1 to 4). The sealing means (not shown) is placed between the cap 46 and the boss 55, to ensure that these two elements are properly sealed.

For each mechanism 38, the flyweight 43 is cylindrical with a circular cross section, or features another adequate shape; it is located between the arms 44 and secured to the ends opposite axis A by means of screws 59 (FIGS. 7 and 8). The flyweight 43 is capable of moving along a longitudinal plane P (FIG. 1) perpendicular to the axis A, between the shroud 11 of the rotor 3 and the cone 17 and shell 21 of the rotor 3.

As shown in FIGS. 7 and 8, the second end 42 of the lever 40 is coupled to the load transfer bearing 28, and more specifically to the external synchroniser ring 32 by means of a tie rod 60. An upstream axial end of the tie rod 60 is articulated around an axis C inside a protection 61 of the connecting rod 45, and a downstream axial end of the tie rod 60 is articulated around an axis D, inside a protection 62 of the external synchroniser ring 32.

When the propulsion system 2 operates normally (no malfunction), the feathering device 38 is subordinated to the pitch control device 22 of the blades 5, and more specifically to the linear actuator 23. It should be noted that when the blades are in the "inverted" position, the flyweights 43 of the mechanisms 39 of the feathering device 38 of the blades 5 are close to and/or in contact with the shroud 11 of the rotor 3 (FIGS. 1, 3, 5, 7).

In the event of a failure (where the blades 5 have to be placed in the feathered position), for example a failure of the hydraulic power supply of the linear actuator 23, the pitch control device 22 of the blades 5 is then subordinated to the feathering device 38, and more specifically to the flyweights 43, which, owing to the centrifugal force, come close to and/or in contact with the cone 17 (FIGS. 2 and 4) in order to impose a feathered position to the blades 5.

The rotor 3 is rotationally guided, with respect to the fixed crankcase 4, by at least one first bearing 7 located upstream and by at least second and third bearings 8,9 located downstream. The first, second and third bearings 7, 8, 9 feature an outer diameter that is greater than the inside diameter of the support 26 under the linear actuator 23. The second and third bearings 8, 9 feature an outer diameter that is greater than the outer diameter of the first bearing 7 located upstream.

This arrangement and sizing of the bearings 7, 8, 9 provide improved radial compactness of the annular space 14 (or oil enclosure), and enable to reduce the hub ratio without altering the mechanical features of the fan 1. Furthermore, this architecture provides for a notable improvement of the dynamic balance of the rotor 3. This improvement stems, specifically, from the arrangement of the bearings 7, 8, 9 with respect to the resulting force that includes, in particular, the forces generated by the motion of the masses rotating around the axis X (and in particular the mass of the control device 22 of the blades 5, the mass of the feathering device 38 of the blades 5, and the mass of the pivots 18 of the blades 5).

In the embodiment shown in the figures, and specifically in the FIGS. 1 and 2, the annular support 26 is centred on X and includes, upstream to downstream, an upstream section 63 and a downstream section 64 that are clamped to one another. The upstream section 63 is largely frustoconical, and widens in the downstream to upstream direction. The downstream section 64 includes, in the upstream to downstream direction, a cylindrical portion 65 with a circular cross section, and a largely frustoconical portion 66 that widens in the upstream to downstream direction.

More specifically, the first and second bearings 7, 8 provide for the rotational guiding of the shaft 10 of the rotor 3 with respect to the fixed crankcase 4.

The first bearing 7 is located close to the upstream axial ends 12, 13 of the shroud 11 and of the shaft 10; in other words, the first bearing 7 is upstream from the linear actuator 23, from the load transfer bearing 28 and from the mechanisms 39 of the feathering device 38 of the blades 5. The inner diameter of the first bearing 7 is greater than the outer diameter of the shaft 10 under the linear actuator 23. The first bearing 7 has an inner diameter that is smaller than the inner diameter of the load transfer bearing 28. The first bearing 7 is a roller bearing (centred on the axis X) that includes an internal ring 67 installed on an annular base 68 (centred on the axis X), which is placed on the shaft 10, and an external ring 68 housed in the upstream section 63 of the support 26. The internal and external rings 67, 69 define a rolling track for the rolling elements 70 (cylindrical rollers 70 in this specific case). The first bearing 7 is therefore able to withstand essentially radial loads.

The second bearing 8 is located downstream from the linear actuator 23 and upstream from the reduction gear 6. The inner diameter of the second bearing 8 is greater than the outer diameter of the first bearing 7. The first bearing 8 is a roller bearing (centred on the axis X) that includes an internal ring 71 installed on an annular seat 72 (centred on the axis X), which is placed on the shaft 10, and an external ring 73 housed in an annular fastener 74 (centred on the axis X) clamped to the fixed crankcase 4. The internal and external rings 71, 73 define a rolling track for the rolling elements 75 (balls 75 in this specific case). The balls are in radial contact with the internal and external rings 71, 73. The second bearing 8 is therefore able to withstand radial and axial loads.

More specifically, the third bearing 9 provides for the rotational guiding of the shroud 11 of the rotor 3 with respect to the fixed crankcase 4.

The third bearing 9 is located downstream from the pitch control device 22 of the blades 5 and upstream from the reduction gear 6. The inner and outer diameters of the third bearing 9 are greater than the outer diameter of the second bearing 8. The third bearing 9 has an inner diameter that is greater than the inner diameter of the load transfer bearing 28. The third bearing 9 is a roller bearing (centred on the axis X) that includes an internal ring 76 installed on an annular platform 77 (centred on the axis X), which is placed on the support ring 16 of the blades 5, and an external ring 78 housed in a ring gear 79 (centred on the axis X) clamped to the fixed crankcase 4. The internal and external rings 76, 78 define a rolling track for the rolling elements 80 (rollers 80 in this specific case). As with the first bearing 7, the third bearing 8 is capable of withstanding essentially radial loads.

It should be noted that each of the bearing rings (first bearing 7, second bearing 8 and third bearing 9) is axially stopped at one of its ends by a retaining wall and at its opposite end by removable axial fastening means, such as a snap ring.

In one of the embodiments shown in the figures, the bearings (first bearing 7, second bearing 8, third bearing 9 and load transfer bearing 28) are lubricated with a fluid lubricator such as oil. Each roller bearing 7, 8, 9, 28 mentioned above is lubricated through a nozzle.

For reasons of clarity, the nozzles and supply ducts are not shown in the figures. It should also be noted that for the load transfer bearing 28, the supply duct of the nozzle is telescopic and located between the mobile body 27 of the actuator 23 and the internal synchroniser ring 30.

According to the embodiment shown in the figures, the fan includes the means to collect and to guide 81 the lubricant of the bearings 7, 8, 9, 28, whereby said collection and guiding means 81 is configured to collect and guide the lubricant from the upstream axial end 13 of the shroud 11, axially in the upstream to downstream direction, and radially from the interior to the exterior, by centrifugal force.

The evacuation of the lubricant injected in the space 14 (oil enclosure) by the various nozzles is shared, so as to minimize the number of components in the hydraulic circuit (the pumps, in particular). The evacuation of the lubricant is achieved with the evacuation means 93, schematically represented in the FIGS. 10 and 11. The collection means is generally located at six o'clock, by analogy to a watch dial.

The collection and guiding means 81 includes an internal annular deflector 82 (centred on the axis X) clamped to the shroud 11, and an external annular deflector 83 (centred on the axis X) fastened to the control device 22 of the blades 5, whereby the external deflector 83 is capable of more-or-less enclosing the internal deflector 82 (partial or total overlapping), depending on the position of the mobile body 27 of the actuator 23.

More specifically, the external deflector 83 includes a threaded annular flange 84 externally screwed inside the external synchroniser ring 32 of the control device 22 for the purpose of fastening the external ring 31. The flange 84 features a downstream surface 94 resting against the external ring 31 of the load transfer bearing 28, and an upstream surface 95 resting against axial retaining means 85 (for example a rotating retainer ring of the flange, in this case).

Figure 10:
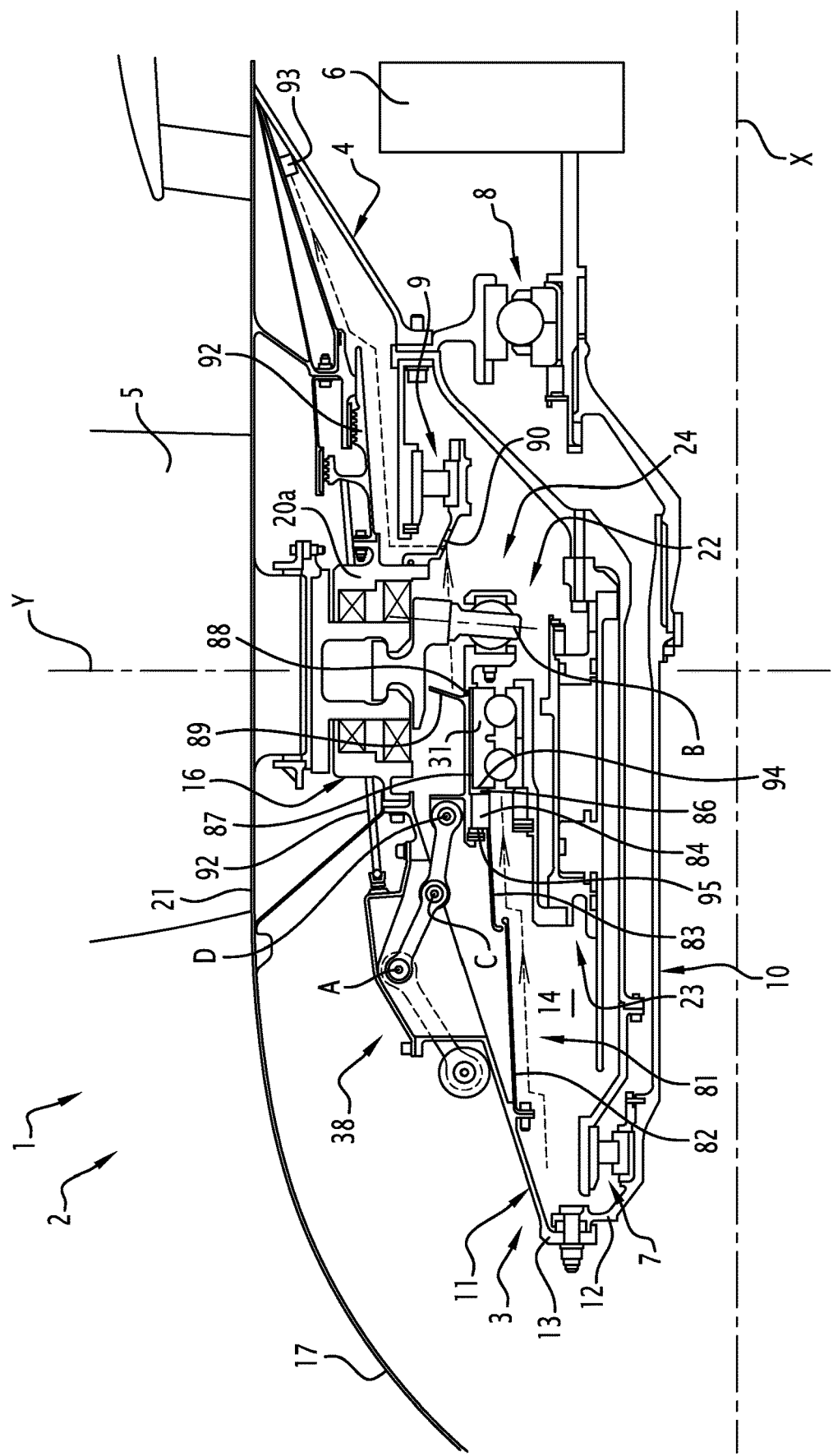
FIG. 10 corresponds with FIG. 1 in which are shown the collection and routing of the lubricant inside an annular space of the fan.

To allow the lubricant to flow into the space 14, as shown in FIG. 10, the downstream surface 94 of the flange 84 includes radial notches 86 allowing the passage of said lubricant. The circumferential internal surface of the external synchroniser ring 32 with respect to the external ring 31 of the load transfer bearing 28 includes axial notches 87 allowing the passage of said lubricant. At the downstream end of the external ring 31 of the load transfer bearing 28, the external synchroniser ring 32 includes the holes 88 allowing the passage of the lubricant. The holes 88 are located downstream from a lubricant guiding lip 89, whereby said lip 89 protrudes from the external synchroniser ring 32 and extends outwards. The platform 77 features multiple apertures 90 to allow the passage of the lubricant. The annular sealing rubbing strips 91 (centred on X) are clamped to the support ring 16 of the blades 5, whereby the rubbing strips surround the ring gear 79 of the fixed crankcase 4. The rubbing strips 91 are placed opposite abradable coating so as to form labyrinth-type seals. These seals significantly reduce lubricant leakage and are traditionally used to ensure proper sealing between a rotor part and a stator part of an oil enclosure.

Figure 11:
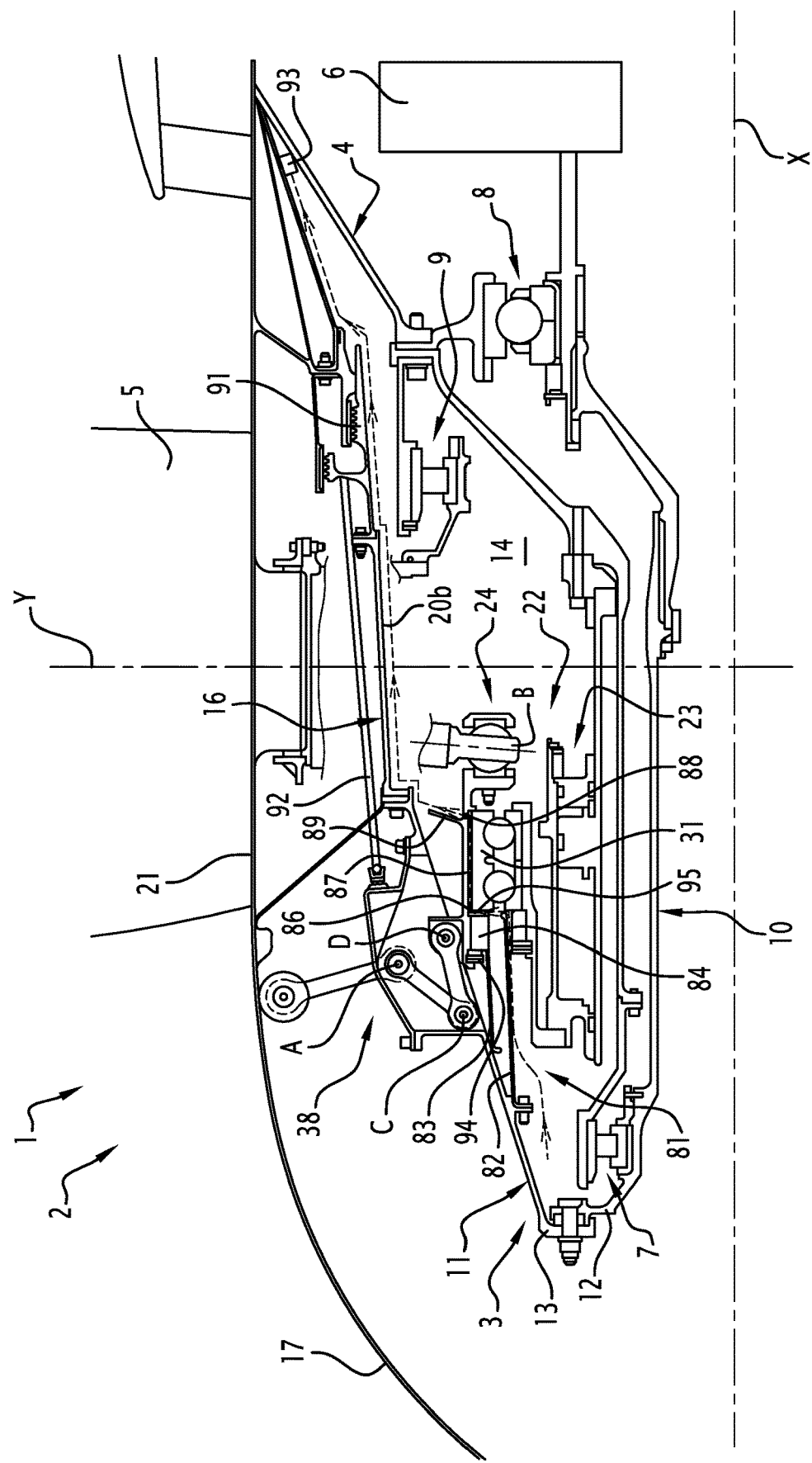
FIG. 11 corresponds with FIG. 2 in which are shown the collection and routing of the lubricant inside the annular space of the fan.

As shown in the FIGS. 10 and 11, owing to the centrifugal force, the lubricant (represented by the dotted arrow) is projected outwards, and flows between the upstream axial end 13 of the shroud 11, axially in the upstream to downstream direction, and radially from the inside to the outside. The lubricant flows at least in succession over (or in) the internal deflector 82, the external deflector 83, the radial notches 86, the axial notches 87, the holes 88, the lip 89, the sides 20b or the apertures 90, and the rubbing strips 91.

In reference to FIG. 11, it should be noted that the lubricant flows by centrifugal force on the sides 20b of the ring 16. The shroud 11 therefore includes, between the two successive bases 20a of the ring 16, a main axial path (sides 20b) allowing the lubricant to flow.

To prevent the lubricant from being trapped (or stored) in the cavities 57 and creating imbalances that are detrimental to the dynamic balance of the rotor 3 of the fan 1, for each mechanism 39 of the feathering device 38 of the blades 5, a drain 92 collects the lubricant in the corresponding cavity 57 and evacuates it into a downstream part of the space 14. In this case, each drain 92 has a circular cross section and is tilted inwards so as to facilitate the flow of the lubricant. Each drain 92 evacuates the lubricant in the space 14 downstream from the support ring 16 of the blades 5.

Figure 12:
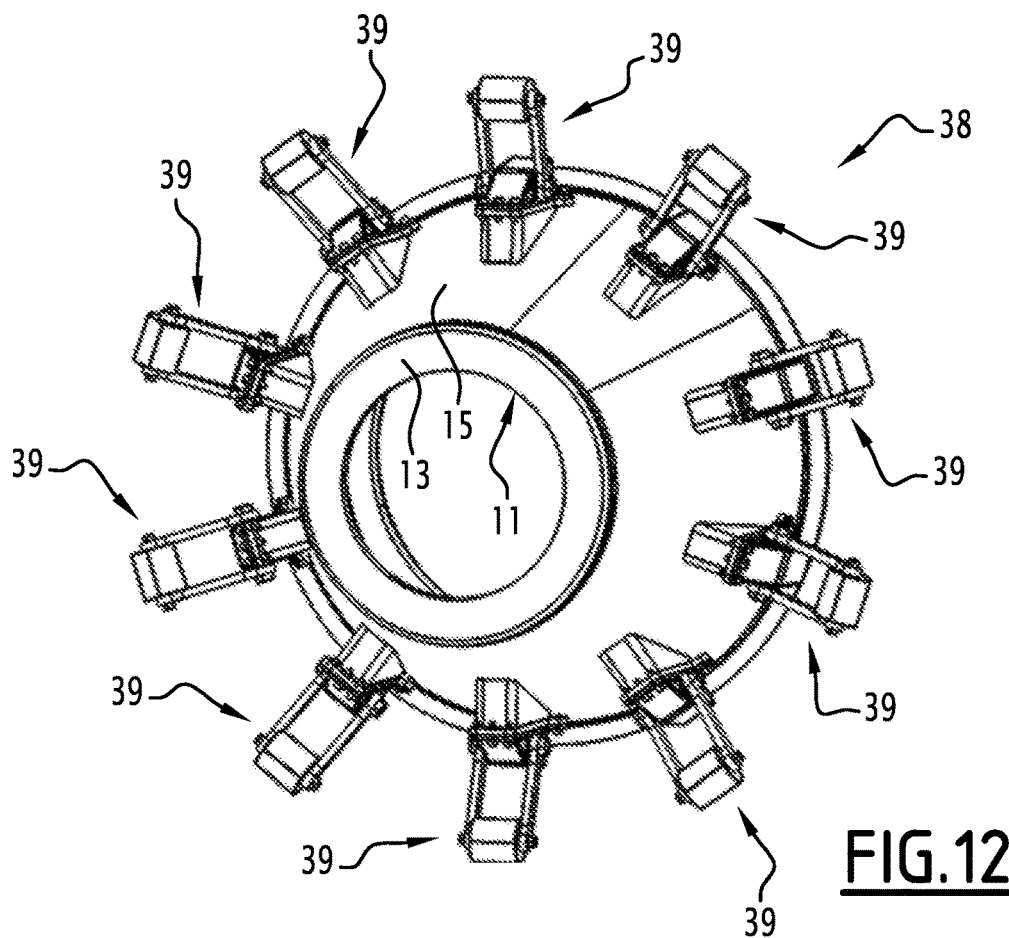
FIG. 12 is a perspective view of an embodiment of the feathering device.

In another embodiment shown in FIG. 12, the feathering device 38 of the blades 5 includes ten mechanisms 39 evenly arranged according to an angular distribution around the axis X.

It should be noted that the figures are provided as examples and are not limited thereto, and the feathering device 38 of the blades 5 according to the invention can be integrated in the propeller rotor of turboprop or in the rotor of any of the two propellers of turbomachinery featuring contra-rotating propellers, also known by the term of "open rotor" In the definition of the invention, the term "fan" also includes the propeller or propellers of said turbomachinery.

This type of feathering device 38 applies more generally to any turbomachinery that includes a pitch control device of the blades, for which a feathering device is necessary.

The invention claimed is:

1. Fan module with variable-pitch blades for a propulsion system along a longitudinal axis (X), whereby said module includes:
   a rotor supporting the blades, and including an internal annular shaft and an external annular shroud that extends around the shaft, an upstream axial end of the shaft is connected to an upstream axial end of the shroud, and the shaft and the shroud together create an annular space;
   a pitch control device of the blades located in said annular space and includes a load transfer bearing;
   a blade feathering device, useable in event of a malfunction of said pitch control device;
   wherein said feathering device includes at least one lever that is articulated around a fixed axis (A) in relation to the rotor, where said lever includes a first end located outside said annular space and a second end located inside said annular space, and a flyweight is fastened to the first end and the second end is coupled to said bearing, and the flyweight by centrifugal force, is movable into a position in which said bearing imposes a feathered position to the blades,
   wherein said at least one lever includes at least one arm located outside said annular space and a connecting rod located inside said annular space, whereby said arm and said connecting rod are linked in rotation.

2. Fan module according to claim 1, wherein the flyweight is movable along a longitudinal plane (P) perpendicular to said axis (A).

3. Fan module according to claim 1, wherein the second end is coupled to said bearing by means of a tie rod which is articulated at each end of the tie rod.

4. Fan module according to claim 3, wherein the tie rod is articulated to an external synchroniser ring fastened to an external ring of said bearing.

5. Fan module according to claim 1, wherein the flyweight is located between said shroud of said rotor and a cone and/or a shell of said rotor.

6. Fan module according to claim 1, wherein at least one of said arm and said connecting rod is articulated around said axis (A).

7. Fan module according to claim 1, wherein said at least one lever is articulated around said axis (A), in relation to a cap of said shroud.

8. Fan module according to claim 7, wherein said at least one lever is articulated in relation to said cap by an axis, and a seal is disposed between said axis and said cap.

9. Fan module according to claim 7, wherein said cap defines an interior cavity, whereby said shroud contains a drain to collect a lubricating fluid contained in said cavity and to evacuate said lubricant in the downstream section of said annular space.

10. Fan module according to claim 7, wherein said cap is added to the shroud.

* * * * *